United States Patent [19]

Chen

[11] Patent Number: 6,100,321

[45] Date of Patent: Aug. 8, 2000

[54] STEARIC-MODIFIED IONOMERS FOR GOLF BALLS

[75] Inventor: John Chu Chen, Hockessin, Del.

[73] Assignee: E. I. du Pont de Nemours and Company, Wilmington, Del.

[21] Appl. No.: 09/056,802

[22] Filed: Apr. 8, 1998

Related U.S. Application Data

[60] Provisional application No. 60/043,552, Apr. 15, 1997.

[51] Int. Cl.[7] .......................... A63B 37/02; A63B 37/06
[52] U.S. Cl. ...................... 524/400; 524/394; 524/399; 473/357; 473/372; 473/373; 473/385
[58] Field of Search .................................. 524/394, 399, 524/400; 473/357, 359, 372, 373, 385

[56] References Cited

U.S. PATENT DOCUMENTS

| | | | |
|---|---|---|---|
| 3,264,272 | 8/1966 | Rees | 260/78.5 |
| 3,847,854 | 11/1974 | Canter | 260/23.7 M |
| 3,870,841 | 3/1975 | Makowski et al. | 260/23.7 R |
| 4,351,931 | 9/1982 | Armitage | 526/227 |
| 4,591,611 | 5/1986 | Jenkins et al. | 524/64 |
| 5,312,857 | 5/1994 | Sullivan | 524/400 |
| 5,508,350 | 4/1996 | Cadorniga et al. | 525/193 |
| 5,691,418 | 11/1997 | Hagman . | |
| 5,803,831 | 9/1998 | Sullivan . | |

FOREIGN PATENT DOCUMENTS

| | | |
|---|---|---|
| 2277741 | 11/1994 | United Kingdom . |
| 2278609 | 12/1994 | United Kingdom . |
| 2286400 | 8/1995 | United Kingdom . |

OTHER PUBLICATIONS

International Search Report, dated Aug. 5, 1998.

*Primary Examiner*—David Buttner
*Attorney, Agent, or Firm*—Kevin S. Dobson

[57] ABSTRACT

Ethylene/(meth)acrylic acid ionomers which have been modified with relatively low levels of a stearic acid moiety, particularly metal stearates and especially calcium stearate have improved resilience for a given level of hardness or PGA Compression values. The improvement is seen in bulk material when measurements are made on solid neat spheres. When used as cover material, the improvement is more manifest for softer material, and is less, or disappears, for typical mixed metal ionomer hard covers. The stearic-modified ionomers or ionomer blends are especially useful when the ionomer is formulated for use as a golf ball core, center, one-piece ball and as a soft golf ball cover. For covers, softer ionomer compositions will show an improvement.

6 Claims, No Drawings

STEARIC-MODIFIED IONOMERS FOR GOLF BALLS

This application claims the benefit of U.S. Provisional Application No. 60/043,552, filed Apr. 15, 1997.

BACKGROUND OF THE INVENTION

1. Field of the Invention

The invention relates to ionomers which have been modified with relatively low levels of a stearic acid moiety, particularly metal stearates and especially calcium stearate. The stearic-modified ionomers are especially useful when the ionomer is formulated for use as a golf ball core, center, one-piece ball, a soft golf ball cover, a mantle or in or as an intermediate layer between the center and the cover of a multi-layered ball.

2. Description of Related Art

Stearic acid and metal stearates have long been known as additives for many polymers. Typically they are used as process aids, and are referred to as lubricants dispersants release agents or plasticizers. They are generally used in small amounts. Their action may be external where, for instance, with nylon, ABS, polyester, and polystyrene they have been used, at low levels, to aid in metal release. Internally they may aid in dispersing additives in polymers, or, they may act as 'lubricants' or 'plasticizers' for the polymer itself. The words 'lubricants' and 'plasticizers', particularly the latter, require specific definition, because they tend to be used as a catch-all, to describe effects on solid state properties such as stiffness, and/or melt properties, such as melt flow. Any art related to these additives must be examined carefully for what specific changes are brought about by the additive, since these words, particularly when used to describe stearic acid and stearates, are not used in a consistent way.

Typically, levels of 0.01 to 5 pph stearic acid or stearates are used in rubber and plastic formulations. In ionomers, 0.01 to about 1.0 pph zinc stearates has been utilized since the 1960s to facilitate the flow of ionomer resins in the molding process. U.S. Pat. Nos. 3,847,854 and 3,870,841 disclose the ability to plasticize the melt of ionic hydrocarbon polymers, by relaxing the ionic bonds. These plasticizers affect the melt and are not disclosed to affect the properties at normal use temperatures, since non-volatile plasticizers remain essentially as inert fillers and volatile ones are evolved after they have performed their process aid function. U.S. Pat. No. 3,847,854 discloses that with non-volatile plasticizers, which include calcium stearate, zinc stearate and stearic acid, amounts used should be no more than 6–7 weight percent, preferably less than 4 weight percent, so that melt plasticization, and not backbone plasticization is required. Backbone plasticization presumably results in a softer polymer. The ionomers listed include neutralized ethylene/(meth)acrylic acid polymers, in that the basic patent related to these, U.S. Pat. No. 3,264,272 is listed as describing typical ionomers. The disclosure however is concerned mainly with sulfonated ionomeric polymers. The disclosure of U.S. Pat. No. 3,870,841 is essentially similar with respect to calcium stearate, zinc stearate, and stearic acid.

U.S. Pat. No. 4,591,611 (Jenkins, et al.) discloses ionomeric polymers, including ethylene/methacrylic acid copolymers by patent reference, which contain about 5 to 125 parts of gilsonite per 100 parts of polymer which improve certain properties. The ionomeric polymers are preferentially sulfonated EPDM terpolymers. Optionally the compositions may contain from 5 to 40 parts of a melt plasticizer which is preferentially zinc stearate.

U.S. Pat. No. 5,312,857 discloses ethylene/carboxylic acid ionomers which contain from 10 to 100 parts, preferably 25 to 100 parts, of metal stearates, including zinc, calcium, barium, magnesium, sodium and aluminum. The compositions are disclosed as being useful for golf ball covers because such covers are cheaper and have no loss in properties as a result of the high level of inexpensive stearate, and even can show 'similar or improved' coefficient of restitution (COR) and 'similar or improved (decreased)' hardness. The changes in COR and reduction in hardness, if such changes occur at all, are however minimal. The essential aim appears to be to add a large amount of inexpensive filler while essentially maintaining the same properties. There is no disclosure of major effects on properties, and no disclosure of the compositions being useful for parts of a golf ball other than the cover. The examples presented in this patent suggest that the metal stearates do not negatively impact the otherwise known properties of the ionomers.

Ethylene/(meth)acrylic acid 'hard' ionomers optionally containing a 'softening' alkyl acrylate termonomer ('soft' ionomers), and blends of these, are well known for use as golf ball cover materials. Such ionomers are sold under the tradename SURLYN® ionomer resins, sold by E. I. du Pont de Nemours and Company. For the most part, existing ionomers exhibit a fixed relation between two key golf ball material properties, resilience and softness. Generally as resilience increases, so does hardness. The major drive in searching for improved ionomers in golf ball cover materials is to find ionomers which have improved resilience as measured by COR, yet have higher softness (measured, for instance by lower PGA Compression), or spin, relative to the COR. Hardness/softness can readily be changed by changing the ionomer composition, but deviations from the relatively fixed COR/PGA Compression line are difficult to achieve. Any composition which can achieve a positive deviation from this correlation is highly desirably, particularly for use in golf ball cores, centers, and also for golf ball covers.

SUMMARY OF THE INVENTION

The key to the invention is the discovery that intermediate amounts of metal stearates, particularly calcium stearate, produce dramatic improvements in the COR/PGA Compression correlation, well beyond any effects which are disclosed as occurring at high levels of stearates. The effect is strongest when the additives are incorporated in soft ionomers. For hard and soft ionomers, the effect is apparent on the resin itself, and thus such ionomers are ideally suited to uses where the resin itself is present as a solid block, such as the spheres of golf ball cores, centers, and even one-piece golf balls. Higher levels of stearates may also be used in cores, centers and one-piece balls. As cover materials, soft ionomers or blends containing soft ionomers are necessary to retain improvements in the COR/PGA correlation as measured on the ball itself.

Specifically, the invention comprises;
 a golf ball having a core and a cover, or a wound center and a cover, the core or center comprising or consisting essentially of;
  (i) an ionomeric polymer derived from an acid copolymer containing
   a) ethylene,
   b) from 5 to 25 weight percent (meth)acrylic acid,
   c) from 0 to 40 weight percent of a 1 to 8C-alkyl, alkyl acrylate, the ionomeric polymer formed by partial neutralization of the acid copolymer with metal ions selected from the group consisting of lithium, sodium, zinc, calcium, magnesium, and a mixture of any these, the neutralization level being from 10 to 90 percent, and (ii) from 5 to 45 weight percent, based on (i) plus (ii), of a metal stearate, the metal selected from the group consisting of calcium, sodium, zinc, and lithium, barium and magnesium or a mixture of said metal stearates.

A further aspect of the invention is the use of the above composition as a one-piece golf ball.

Yet a further aspect of the invention is the use of the above composition where c) is from 0 to 40 weight percent alkyl acrylate, and the level of stearate is from 5 to 20 weight percent, as a cover material for golf balls.

Especially preferred as the stearate is calcium stearate. Magnesium stearate is also preferred.

Yet a further aspect of the invention is use of the compositions of the invention for mantles or intermediate layers between the center and cover of a multi-layered golf ball. Such multi-layered balls containing said compositions are also within the invention. An additional aspect of the invention is a golf ball having a core and a cover, wherein the cover composition consists essentially of (i) an ionomeric polymer derived from an acid copolymer containing
   a) ethylene,
   b) from 5 to 25 weight percent (meth)acrylic acid,
   c) from 0 to 40 weight percent of a 1 to 8C-alkyl, alkyl acrylate,
   the ionomeric polymer formed by partial neutralization of the acid copolymer with metal ions selected from the group consisting of lithium, sodium, zinc, calcium, magnesium, and a mixture of any these, the neutralization level being from 10 to 90 percent, and (ii) from 10 to 18 weight percent, based on (i) plus (ii), of a metal stearate, the metal selected from the group consisting of calcium, sodium, zinc, and lithium, barium and magnesium or a mixture of said metal stearates.

DETAILED DESCRIPTION OF THE INVENTION

In this disclosure, the term copolymer is used to refer to polymers containing two or more monomers. The term bipolymer or terpolymer refers to polymers containing only two or three monomers respectively. The phrase 'copolymer of' (various monomers) means a copolymer whose units are derived from the various monomers.

The ionomers of this invention are prepared from 'direct' acid copolymers, that is to say copolymers polymerized by reacting all monomers simultaneously, as distinct from a graft copolymer, where a monomer or other unit is grafted onto an existing polymer, often by a subsequent polymerization reaction. Methods of preparing ionomers are well known, and are described in U.S. Pat. No. 3,264,272, (Rees) which is hereby incorporated by reference. Methods of preparing the acid copolymers on which the ionomers are based is described in U.S. Pat. No. 4,351,931, which is also incorporated by reference hereby.

The ionomers suitable for modification with the stearate additives are partially neutralized copolymers of ethylene with methacrylic acid and/or acrylic acid at a level of 5 to 25 weight percent. The use of either or both of these acids will be designated conveniently as (meth)acrylic acid. Above 25 weight percent, preparation of acid copolymer precursors for the ionomers becomes difficult. Below 5 percent, insufficient ionomer character is developed on neutralization. Optionally and preferably, a third 'softening' monomer is present, which is a 1 to 8 carbon alkyl, alkyl acrylate, present at a level of 0 to 40 weight percent. The total comonomer content however should not exceed 50 weight percent. The ionomers may be neutralized with sodium, zinc, lithium, magnesium or calcium. The acid copolymers from which ionomers are prepared are conveniently referred to as precursor polymers. The precursor polymers have a melt index of from about 10 to 300 grams/10 minutes (g/10 min.), preferably 30 to 250 g/10 min., most preferably 30 to 100 g./10 min. After neutralization of the precursor acid copolymer, the ionomer which results has an MI of from 0.1 to 40 g/10 min. The level of neutralization of the ionomers is from about 10 to 90%, preferably 25 to 70%.

The invention applies to both hard, stiff ionomers, i.e., those without a softening monomer, as well as to soft ionomers, and to blends of hard and soft ionomers. It has been found, as the data below indicate, that with stiff ionomers, addition of stearates improve the COR/PGA compression correlation, as measured on neat-spheres; but when the ionomer/stearate blends are used as golf ball cover material, the COR/PGA correlation (i.e., measured on balls with the ionomer stearate blend as cover) less improvement is seen. However, with soft ionomers, and to a lesser extent with hard ionomer/soft ionomer blends, the improvement seen in neat-sphere tests also carries through to use as cover materials. Since the improvement is seen for all ionomers as measured on neat spheres, the improvement of the invention makes all ionomers modified with stearates useful in cores, centers and one piece balls. For covers, soft ionomers show a greater advantage, though blends of soft and hard ionomers can show some advantage.

The compositions of this invention, while useful for other purposes, are particularly useful as materials for use in golf balls. This disclosure emphasizes the particular properties of interest in that end use, the excellent properties so revealed showing the uniqueness of these ionomer compositions. In view of the large difference in the particular properties measured from other ionomer compositions, it is believed that other characteristics or properties which related to other particular end uses will also be unique, and thus the compositions will, in many cases, be advantageous for other end uses.

There are different types of golf balls, suited to different levels of playing skill and playing conditions. One goal has been to emphasize resilience, since higher resilience corresponds to greater driving length. Higher resilience is associated with harder balls. Softer balls generally have higher playability or spin. A holy grail has always been to have the best of both worlds, high resilience and high spin. Thus if a softer ball could be made with higher resilience than hitherto, it would be highly desirable. However, it is relatively easy to alter the hardness, e.g., as measured by PGA compression, of an ionomer particularly by changing the amount of softening monomer, but also by changes in acid level, neutralization level and neutralizing metal. At any given level of hardness however, or more specifically PGA Compression, the COR tends to be determined by a fixed relation to the PGA Compression. That is to say, it is difficult to increase the COR for any given PGA Compression level using the above four composition variables. Alternatively, it is difficult to decrease PGA Compression for a given level of COR. The present invention is directed to compositions especially useful for golf ball cores and centers, and even one piece balls with high resilience at any given hardness level or lower hardness, specifically low PGA compression at a given COR level.

A common measure of resilience in the golf ball industry is the Coefficient of Restitution (COR) of the ball. The COR of a 'neat-sphere' of a material however can be a useful guide to the utility of that material for golf ball use, particularly for cores, and centers of balls and for one-piece balls.

Because determination of COR has been carried out under a bewildering variety of conditions, comparison with much of the patent or other published data, is difficult. For any particular method, however, comparisons of various materials can be meaningfully made using measurements on 'neat-spheres' of the resin. The phrase neat-sphere in this disclosure means spheres molded from the resin alone, without filler or additive. The method used in the present investigation for COR and PGA compression are given below.

A good correlation of 'playability' or 'spin' of a ball may be made using a test referred to as 'PGA Compression', which is a standard industry test. It may be carried out on neat-spheres and, like COR, such a determination will be the best characterization of the nature of the material itself. Perhaps confusingly, high values of the numbers referred to as PGA Compression correspond to high hardness and stiffness, or lower compressibility. Use of the word 'Compression' in relation to the PGA test and the general term 'compressibility' should not be confused, since they are inversely related.

The modifiers of this invention, metal stearates, especially calcium stearate, and stearic acid may be blended with the ionomer by any of the processes known in the art for dispersing conventional fillers. These methods include dry blending, milling, kneading, Banbury mixing, plasticating extrusion, etc. Plasticating extrusion is particularly preferred.

The amount of metal stearate or stearic acid blended with the ionomers, which form the compositions used in the present invention, is from 5 to 45 weight percent, for core center and one-piece balls, preferably 7 to 35 or 8–20 weight percent. For covers 5–20 weight percent is suitable.

Calcium stearate and magnesium stearate are preferred and compositions tested for COR and PGA compression were made using this stearate. Other stearates and stearic acid will have some effect on the COR/PGA Compression correlation. Using Dynamic Mechanical Analysis (DMA), tan d values have been used to compare COR for various compositions. Experiments with calcium stearate modified compositions indicated that the lower tan d, the higher the COR and the better the COR/PGA correlation. Assuming tan d values can be used to indicate the effectiveness of different metal stearates, at 15 weight percent stearate level in sodium ionomer containing 15 weight percent methacrylic acid, calcium stearate lowered tan d at 25° C., 20 Hertz more than for Li, Mg, Zn or Ba stearates with Mg, Zn and Ba being close to calcium. With Zinc ionomer, calcium stearate was also most effective but equaled by sodium stearate with lithium, magnesium and barium stearate slightly less effective. In both series of experiments, the exception to decreased tan d was with sodium stearate in sodium ionomer and with zinc stearate in zinc ionomer. This suggests that, in addition to an improvement due to the stearate moiety in general, an important effect is a mixed ion effect. That is to say, when two or more different ions are present, the effect is greater. Mixed ions are well known for use in ionomers for golf ball cover use, though usually the use of mixed ions, such as zinc/sodium, and zinc/lithium among others, is used to improve a variety of properties. While not committing to any theory, it may be that stearate addition is most effective with mixed ions. Any metal stearate with an ionomer employing a different metal will produce a composition with mixed ions. While calcium stearate appears best in the above described DMA experiments, calcium stearate in a calcium ionomer may not produce as great an improvement as found for the sodium and zinc ionomers. Mixed two metal ionomer blends alone, (i.e., with no stearate moiety) and in which one of the two metals was calcium, indicated that ionomer blends of two different metals one of which was calcium did not provide the dramatic improvement in PGA Compression/COR which calcium stearate provides. In other words, the improvement observed with calcium stearate in zinc and sodium ionomers can not be explained merely by the mix of metal ionomers alone, and stearate moiety must be present.

As a corollary to the need for mixed ions in the final composition, either from the stearate metal with another metal ionomer or from a stearate in a mixed metal ionomer blend where one of the ionomer metal ions is the same as the stearate metal, it is preferred that there be at least two metal ions in the final composition.

It is well known in the art that in ethylene/carboxylic acid ionomers, metal ions are labile, and not necessarily associated with one particular acid group. Ion clusters can occur acting as crosslinks in the solid state, but the ions are sufficiently labile to allow thermoplastic processability. If stearic acid rather than a stearate is added to an ionomer, there will be a distribution of the metal ions of the ionomer between the acid groups of the ionomer and the acid groups in the stearate. Thus, in effect a metal stearate will be present. Stearic acid added to an ionomer or mixed (metal) ionomers will thus, in effect contain stearates, but the level of neutralization of the ionomer itself, (i.e., ions associated with the polymer) will decrease, since some ions will become associated with the stearic moiety. If the ionomers have high levels of neutralization, it is possible to prepare the materials of the invention by adding stearic acid, rather than a stearate, since in effect, polymer with metal stearates, with somewhat lower level of neutralization of the ionomer, will result.

When the ionomers or ionomer blends of this invention are to be used for one-piece balls, or for cores or centers of balls, metal oxides or other inert inorganic fillers will need to be added to achieve a density so that the ball weight is within a normal weight range for a golf ball. Fillers such as zinc oxide and barium sulfate are suitable, though any inert inorganic filler can be used. The final density of a ball should be within the range 1.115 to 1.135 g/cc. For one-piece balls, therefore, the amount of filler should produce about this density in the material. Cores and centers form only part of a ball. Centers may vary considerably in diameter, and even cores can vary in diameter (corresponding to different thickness covers). Since the weight or density constraint is on the finished ball, the amount of filler for cores and centers will vary depending on their size, and on the material used in the rest of the ball. It will be within the skill of the artisan to determine the amount of a given inorganic filler needed in a core or center to obtain the required ball density knowing the size of the core or center and the thickness and density of the other components, since this amount may be obtained by simple calculation.

For any uses where the stearate/ionomer blends of this invention is at the surface of the golf ball, such as when used as a cover, or a one-piece (as distinct from when not part of the surface such as in a core or center), the ionomers may also contain conventional additives such as pigments, antioxidants, U.V. absorbers, brighteners and the like.

Testing Methods and Criteria.

Coefficient of Restitution, COR, was measured both on neat-spheres and on finished balls having a cover of the material under test. It is measured by firing, either a covered ball having the ionomer composition as cover, or a neat-sphere of the ionomer composition, from an air cannon at an initial speed of 180 ft./sec. as measured by a speed monitoring device over a distance of 3 to 6 feet from the cannon. The ball strikes a steel plate positioned 9 feet away from the cannon, and rebounds through the speed-monitoring device. The return velocity divided by the initial velocity is the COR.

COR of neat-spheres of the invention may fall anywhere between 0.50 and 0.75. A typical range on useful covered balls of this invention, however, is between about 0.67 and 0.75.

PGA Compression is defined as the resistance to deformation of a golf ball, measured using a standard industry ATTI machine. It was measured on a neat-sphere of resin and on balls having a cover of resin. For adequate spin of a ball, when the ionomer is used as a cover material, the PGA Compression, measured on a neat-sphere should be less than about 155.

The PGA Compression of a ball using the resin as a cover is, of course, dependent on the core of the ball. Generally, the PGA Compression of finished balls is much lower than the 155, and is typically in the 80 to 100 range. Thus on finished balls with the material as cover, the values of COR and PGA Compression fall in a different range than for values for neat-spheres of the material. The desirable PGA Compression of a ball itself is typically in the 80 to 100 range. The PGA Compression/COR correlation for balls is much more attractive than for neat-spheres, as indicated by a vast shift of the line to the right for finished balls. This range can be achieved, however, using conventional cores, and cover material having neat-sphere PGA Compression values about in the 110 to 155 range.

Clearly, a one-piece ball, which is a sphere molded from resin and filler and minor quantities of typical additives, will not generally have as good a PGA Compression/COR relation as a ball made from a core and cover. While such one-piece balls would not have the same PGA Compression/COR relation as neat-spheres, because of the effect of filler, they would have a correlation more akin to that of neat-spheres than to balls with a core. While useful as 'range' balls, such one-piece balls will not have the superior properties of two and three-piece balls. Nevertheless, materials of this invention would still make superior balls having properties exceeding the 'range' ball category performance requirements. All the materials of the invention will be suitable for one piece balls.

Melt Index (MI).was measured using ASTM D-1238, condition E, at 190 deg. C., using a 2160 gram weight. Values of MI are in grams/10 minutes.

Durability was measured using a repeat impact test on finished balls, with the material of the invention as the cover, on a Wilson Ultra® conventional solid core. Such cores are believed to be made of 1,4-cis polybutadiene, crosslinked with peroxides and co-crosslinking agents such as zinc (meth)acrylate. Durability is measured using the same machine as for COR, but using an initial velocity of 175 ft./sec. Durability values are the number of hits to break. Durability at low temperatures is especially desirable, and for this reason, durability tests at −20° F. were carried out. While good durability only at room temperature is adequate for golf balls used in some locales, low temperature durability values, preferably above at least 10, as tested under these conditions, is preferred for cold weather use. Durability at room temperature is almost invariably better than durability at −20° F., so that low temperature durability is a guide to the worst performance to be expected. Good durability of a material, based on tests when the material is used as a cover, may indicate good durability for use as a material in a one-piece ball.

Mantles or intermediate layers of such compositions in multi-layered balls are also prepared from said compositions.

In addition, the mold release properties of the recited compositions containing a 15 wt. % calcium stearate loaded ionomeric cover composition provided unexpected and enhanced mold release characteristics in compression and injection moldings over the same composition without the calcium stearate. Compression molding with SURLYN®AD8542 and this same ionomeric composition with 15 wt. % calcium stearate using Al or Kapton sheets as the shim showed significant improvement in release with the calcium stearate formulation. In addition, under injection molding conditions using a 50:50 blend of SURLYN AD8542 and SURLYN 8172 as a cover material versus the same blend with a 15 wt. % calcium stearate load as cover material over a core (a two-piece ball) demonstrated improved mold release characteristics over the non-loaded cover. Demolding of the balls was smooth.

EXAMPLES

Series 1:

In these examples, 15 weight percent calcium stearate was blended with sodium, zinc, lithium or magnesium stiff ionomers or certain blends of these stiff ionomers. The ionomers themselves were based on ethylene/methacrylic acid copolymers containing 15 or 19 weight percent acid. Some stearate compositions were also compared with blends of the same ionomers with 15% acid calcium ionomers, in order to compare the effect of calcium ion alone in ionomers, and in the presence of a stearate moiety. Measurements were made on neat-spheres of the compositions. The results, therefore, are of particular relevance to use of the material in a 'bulk' form for golf ball or components, such as a core, a center or a one-piece ball.

TABLE 1

PROPERTIES OF STIFF IONOMERS WITH CALCIUM AND STEARATE MOIETIES-
(NEAT SPHERE MEASUREMENTS)

| # | Composition | PGA Compression | COR @ 180 ft/sec. |
|---|---|---|---|
| 1 | E/MAA (15%)/Na | 159 | .679 |
| 2 | 50% E/MAA (15%) Na + 50% E/MAA (15%) Ca | 159 | .680 |
| 3 | E/MAA (15%)/Na + 15% Calcium Stearate | 152 | .702 |
| 4 | E/MAA (15%)/Zn | 163 | .652 |
| 5 | 50% E/MAA (15%) Zn + 50% E/MAA (15%) Ca | 164 | .678 |
| 6 | E/MAA (15%)/Zn + 15% Calcium Stearate | 157 | .706 |
| 7 | 50% E/MAA (15%)/Zn + 50% E/MAA (15%)/Na | 166 | .696 |
| 8 | 50% E/MAA (19%)/Zn + 50% E/MAA(19%)/Na | (i)170 (ii)178 | (i).707 (ii).698 |
| 9 | #8 + 15% Calcium Stearate (corresponds to measurement (ii).) | 169 | .717 |
| 10 | E/MAA (19%)/Na | 173 | .675 |
| 11 | E/MAA (19%)/Na + 15% Calcium Stearate | (i)166 (ii)171 | (i).716 (ii).709 |
| 12 | E/MAA (19%)/Zn | 174 | .630 |
| 13 | E/MAA (19%)/Zn + 15% Calcium Stearate | 170 | .683 |
| 14 | E/MAA (15%)/Li | 166 | .682 |
| 15 | E/MAA (15%)/Li + 15% Calcium Stearate | 162 | .708 |
| 16 | E/MAA (15%) Mg | 155 | .662 |
| 17 | E/MAA (15%) Mg + 15% Calcium Stearate | 150 | .699 |
| 18 | E/MAA (15%) Li + E/MAA (15%) Zn | 166 | .686 |
| 19 | #18 + 15% Calcium Stearate | 160 | .710 |
| 20 | E/MAA (15%) Mg + E/MAA (15%) Na | 157 | .679 |
| 21 | #20 + 15% Calcium Stearate | 151 | .706 |

(i) and (ii) measurements on same compositions made and measured at different times.
MAA = methacrylic acid,
E = ethylene The E/MAA (15%) sodium ionomer is the same in each example where it is used, and is 59% neutralized, and has an MI of 0.9 g./10 min.
Similarly for the E/MAA (15%) zinc ionomer which is 58% neutralized, MI=0.7
Similarly for the E/MAA (15%) calcium ionomer, ~50% neutralized, MI=0.89
Similarly for the E/MAA (19%) sodium ionomer, 37% neutralized, MI=2.0
Similarly for the E/MAA (19%) zinc ionomer, 36% neutralized, MI 1.0
Similarly for the E/MAA (15%) lithium ionomer, 52% neutralized, MI=1.8
Similarly for the E/MAA (15%) magnesium ionomer, ~55% neutralized, MI=0.9

TABLE 2

PROPERTIES OF SOFT IONOMERS
SOFT IONOMER AND SOFT/HARD
IONOMER BLENDS WITH STEARATE-
(NEAT SPHERE MEASUREMENTS)

| # | Composition | PGA Compression | COR @ 180 ft/sec |
|---|---|---|---|
| 2-1 | E/nBA/MAA/Na (~68/23/9)/~50% neutr. | 44 | .548 |
| 2-2 | 2-1 + 15% Calcium Stearate | 103 | .648 |
| 2-3 | E/nBA/MAA/Zn (~68/23/9)/~50% neutr. | 46 | .519 |
| 2-4 | #2-3 + 15% Calcium Stearate | 109 | .678 |
| 2-5 | 50% 2-1 + 50% 2-3 + 15% Calcium Stearate | 115 | .668 |
| 2-6 | 50% 2-3 (soft) 50% E/MAA (15%) (hard) | 136 | .639 |
| 2-7 | 2-6 + 15% Calcium Stearate | 139 | .700 | nBA = n-butyl acrylate
The E/nBA/MAA sodium ionomer is ~52% neutralized, MI = 1.0
The E/nBA/MAA zinc ionomer is ~51% neutralized, MI = 0.6

TABLE 3

PROPERTIES OF GOLF BALLS USING VARIOUS IONOMER COMPOSITIONS AS COVER MATERIAL

| # | PGA Compression | COR @ 180 ft/sec | Durability, RT/−20° F. |
|---|---|---|---|
| 1 | 92 | .699 | 18/2 |
| 3 (1 + CaSt) | 95 | .723 | 43/35 |
| 12 | 101 | .726 | 53/45 |
| 13 (12 + CaSt) | 100 | .736 | 24/13 |
| 14 | 102 | .731 | 74/41 |
| 15 (14 + CaSt) | 95 | .729 | 49/15 |
| 16 | 94 | .718 | 60/49 |
| 17 (16 + CaSt) | 92 | .724 | 60/28 |
| Above, single ionomers (hard) Below, two metal ionomer blends (hard) | | | |
| 8 (ii) | 104 | .747 | 53/10 |
| 9 (8(ii) + CaSt) | 103 | .745 | 40/2 |
| 18 | 100 | .731 | 36/47 |
| 19 (18 + CaSt) | 99 | .731 | 15/15 |
| 20 | 96 | .726 | 70/50 |
| 21 (20 + CaSt) | 94 | .726 | 37/30 |
| Below: Na Soft/ Zn Hard blends | | | |
| 50% 2-1(Na soft) 50% 12(Zn hard) | 86 | .678 | 100/1 |
| Above soft/hard blend + 15% CaSt | 90 | .687 | 100/2 |
| 2-6 (soft/hard) | 92 | .691 | 99/30 |
| 2-6 + 15% CaSt | 91 | .698 | 71/44 |

CaSt = Calcium Stearate

The desirable result is for PGA Compression to drop and COR to increase. It can be seen from the above data that mixed ionomers of Na and Ca show little improvement over Na ionomers alone. With Zn/Ca mixed ionomers there is a minor improvement in COR over the zinc ionomer alone. Nevertheless, when 15% calcium stearate is added to sodium or zinc ionomer, the decrease in PGA Compression and increase in COR is very significant. This serves to demonstrate that mixed ions alone are not significant in improving PGA/COR correlations to anywhere near the same extent as the improvement observed when calcium stearate is added to either of the ionomers.

The improvement in the PGA/COR correlation is also seen with lithium and magnesium stiff ionomers and in those blends of stiff ionomers tested, which were sodium/zinc ionomer blends.

Series 2:

Compositions based on soft ionomers and soft ionomer blends, with and without calcium stearate are shown in Table 2. In the case of soft ionomers, the improvement in PGA/COR correlation is dramatic, and far greater than with stiff ionomers and stiff ionomer blends discussed above. Compositions based on soft ionomers, are thus preferred. Compositions based on soft/hard ionomer blends fall in an intermediate position with respect to the improvement to be expected, and thus to their utility.

Series 3:

These measurements in series 3 tests are on compositions of series 1 and 2, but measured when the material is used as the cover of a golf ball, and measured on the golf-ball itself rather than on a neat-sphere of the composition. The data (Table 3) show that when calcium stearate is mixed with single stiff ionomers, the improvement in PGA Compression/COR correlation seen in neat spheres carries over to some extent to golf balls using the material as covers, though the advantage is not as great as with neat spheres, since COR and PGA will be influenced by the core or center, and not be a function of the cover material alone. When mixed metal ionomers are used, as is usual for golf ball covers, the advantage seen in neat spheres is much reduced, or no improvement seen. With soft/hard ionomer blends, some advantage carries over from neat spheres to golf balls. Since different metal ionomer blends are almost always used in material for covers, there is limited advantage in using the calcium stearate compositions for hard ionomer covers, some for soft ionomer covers, and a slight advantage for soft/hard mixed metal ionomer covers.

In hard blends, measurements of hardness with and without calcium stearate indicated little change, or in many cases a slight decrease, either in neat spheres or when the materials were used as covers. When soft ionomers were examined, as the data above show, COR increased dramatically. So also did PGA compression and hardness. The COR/PGA correlation however still remains very much better for the calcium stearate modified soft ionomers.

Calcium Stearate Effects in Mineral Filled Ionomer Compounds for One-Piece Balls, Cores, Centers or Inner Layers of Multi-Layered Golf Balls The following data in Table 4 demonstrates that calcium stearate increases resilience in filled thermoplastic ionomer compounds for one-piece golf balls. In particular, calcium stearate at 15 pph resin dramatically raises rebound resilience and coefficient of restitution of the particularly disclosed thermoplastic ionomer compounds.

TABLE 4

| Ingredients | 4-C | 4-1 |
|---|---|---|
| SURLYN® 9320 | 100 | 100 |
| calcium stearate | — | 15 |
| zinc oxide | 18 | 18 |
| titanium oxide | 5 | 5 |
| AC143 wax | 8 | 8 |
| Molded one piece balls | | |
| Hardness, D | 54 | 56 |
| PGA Compression | 81 | 117 |
| Drop Rebound % | 52.9 | 65.8 |
| C.O.R.-180 ft/s | .567 | .673 |
| C.O.R.-125 ft/s | .629 | .727 |

Data is also shown below in Table 5 which demonstrates that ionomeric polymeric covers over cores molded from filled thermoplastic ionomers containing calcium stearate produces balls with greater resilience than, for example, one-piece balls made from the calcium stearate containing material. The relative weight percentage of calcium stearate versus ionomer(s) can vary depending upon the end use of the material-e.g., as a one piece ball, core, center, or inner layer or mantle in a multi-layered ball structure. In the Table below, SURLYN® 8542 is an ethylene/23.5% n-butylacrylate/9% methacrylic acid neutralized with about 50% Mg with an MI of 1.1; SURLYN® 8512 is an ethylene/15% methacrylic acid neutralized with about 51% Na and with an MI of 4.5. SURLYN® 8140 is ethylene/19% methacrylic acid neutralized with about 49% sodium and with an MI of 1.0 and SURLYN® 9120 is ethylene/19% methacrylic acid neutralized with about 36% zinc and with an MI of 1.0.

TABLE 5

| Ingredients | Core | Ingredients | Cover |
|---|---|---|---|
| SURLYN ® AD 8542 | 75 | SURLYN ® 8140 | 50 |
| SURLYN ® AD 8512 | 25 | SURLYN ® 9120 | 50 |
| calcium stearate | 15 (13%) | | |
| zinc oxide | 18 | | |
| titanium dioxide | 5 | | |

| Properties | Molded 1.530" core/core alone | two-piece ball cover on core |
|---|---|---|
| Hardness, D | 61 | 68 |
| PGA Compression | 128 | 124 |
| Drop Rebound, % | 67.1 | 69.8 |
| C.O.R.-180 ft/s | .670 | .712 |
| C.O.R.-125 ft/s | .718 | .747 |

The following data shown in Table 6 demonstrates the improvement in resilience in cover blends after being modified with 15 weight percent calcium stearate for neat resin spheres and for two piece balls.

TABLE 6

| | | | | | | |
|---|---|---|---|---|---|---|
| 50% soft ionomer | AD8542 | | AD8542 | | 9320W | |
| 50% hard ionomer | AD8172 | | AD8512 | | AD8512 | |
| | As is | mod. | As is | mod. | As is | mod. |
| NEAT RESIN SPHERES | | | | | | |
| Hardness, D | 60 | 59 | 57 | 58 | 60 | 60 |
| PGA Compression | 131 | 131 | 130 | 134 | 137 | 136 |
| Rebound, % | 62.9 | 68.3 | 62.9 | 69.4 | 64.8 | 69.7 |
| C.O.R.-180 | 0.632 | 0.686 | 0.631 | 0.688 | 0.64 | 0.692 |
| C.O.R.-125 | 0.676 | 0.725 | 0.678 | 0.734 | 0.684 | 0.732 |
| TWO-PIECE BALLS | | | | | | |
| Hardness, D | 60 | 56 | 60 | 59 | 60 | 60 |
| PGA Compression | 86 | 94 | 88 | 92 | 89 | 92 |
| Rebound, % | 74.6 | 75.8 | 73.8 | 75.7 | 74.7 | 75.9 |
| C.O.R.-180 | 0.685 | 0.697 | 0.686 | 0.698 | 0.687 | 0.699 |
| C.O.R.-125 | 0.756 | 0.764 | 0.754 | 0.763 | 0.755 | 0.766 |
| Durability at r.t. | 41 | 99+ | 83+ | 87 | 100+ | 94+ |
| Durability at −20 F. | 41+ | 32+ | 1 | 1 | 46+ | 1 |

What is claimed is:

1. A golf ball having a core and a cover, or a wound center and a cover, the core or center comprising;
   (i) an ionomeric polymer containing
      a) ethylene,
      b) from 5 to 25 weight percent (meth)acrylic acid,
      c) from 0 to 40 weight percent of a 1 to 8C-alkyl, alkyl acrylate, the acid groups neutralized to between 10 and 90 percent with zinc, sodium, lithium, calcium, magnesium ions and a mixture of any of these, and
   (ii) from 5 to 45 weight percent, based on (i) plus (ii), of a metal stearate, the metal selected from the group consisting of calcium, sodium, zinc, lithium, magnesium and barium or a mixture of said metal stearates.

2. The golf ball according to claim 1 wherein c) is from 10 to 40 weight percent alkyl acrylate and the metal stearate is calcium or magnesium stearate at a level of from 7 to 35 weight percent.

3. The golf ball according to claim 1 wherein c) is from 10 to 40 weight percent alkyl acrylate and the metal stearate is calcium or magnesium stearate at a level of from 8 to 20 weight percent.

4. The golf ball according to claim 1 wherein the ionomer composition is a blend of ionomers having more than one metal, where one ionomer has 10 to 40 weight percent alkyl acrylate present and the other ionomer has no alkyl acrylate present.

5. A one-piece golf ball comprising,
   (i) an ionomeric polymer derived from an acid copolymer containing
      a) ethylene,
      b) from 5 to 25 weight percent (meth)acrylic acid,
      c) from 0 to 40 weight percent of a 1 to 8C-alkyl acrylate, the ionomeric polymer formed by partial neutralization of the acid copolymer with metal ions selected from the group consisting of lithium, calcium, sodium, zinc and magnesium and a mixture of any of these, the neutralization level being from 10 to 90 percent, and
   (ii) from 5 to 45 weight percent, based on (i) plus (ii), of a metal stearate, the metal selected from the group consisting of calcium, sodium, zinc, lithium, barium and magnesium or a mixture of said metal stearates.

6. The one-piece ball according to claim 5 wherein the metal in group (ii) is selected from calcium or magnesium.

* * * * *